(12) United States Patent
Reinhold et al.

(10) Patent No.: US 11,453,179 B2
(45) Date of Patent: Sep. 27, 2022

(54) METHOD FOR PRODUCING A FIBER METAL LAMINATE COMPONENT OF AN AIRPLANE

(71) Applicant: Broetje-Automation GmbH, Rastede (DE)

(72) Inventors: Raphael Reinhold, Wittmund (DE); Leo Muijs, Almere (NL); Marko Bosman, Amsterdam (NL)

(73) Assignee: Broetje-Automation GmbH, Rastede (DE)

( * ) Notice: Subject to any disclaimer, the term of this patent is extended or adjusted under 35 U.S.C. 154(b) by 112 days.

(21) Appl. No.: 15/743,045

(22) PCT Filed: Jul. 6, 2016

(86) PCT No.: PCT/EP2016/065929
§ 371 (c)(1),
(2) Date: Jan. 9, 2018

(87) PCT Pub. No.: WO2017/005770
PCT Pub. Date: Jan. 12, 2017

(65) Prior Publication Data
US 2018/0304556 A1 Oct. 25, 2018

(30) Foreign Application Priority Data
Jul. 9, 2015 (DE) ............... 10 2015 009 177.8

(51) Int. Cl.
*B25J 15/06* (2006.01)
*B29C 70/02* (2006.01)
(Continued)

(52) U.S. Cl.
CPC ......... *B29C 70/023* (2013.01); *B25J 15/0616* (2013.01); *B29C 31/08* (2013.01);
(Continued)

(58) Field of Classification Search
CPC . B25J 15/0683; B25J 15/0625; B32B 37/182; B32B 15/14; B32B 38/1866
See application file for complete search history.

(56) References Cited

U.S. PATENT DOCUMENTS

| | | | |
|---|---|---|---|
| 1,279,500 A | 9/1918 | Berry | |
| 2,729,040 A | 1/1956 | Wallace et al. | |

(Continued)

FOREIGN PATENT DOCUMENTS

| | | |
|---|---|---|
| DE | 4210024 | 9/1993 |
| DE | 10152232 | 5/2003 |

(Continued)

OTHER PUBLICATIONS

Bubert, Edward A. "Highly Extensible Skin for a Variable Wing-Span Morphing Aircraft Utilizing Pneumatic Artificial Muscle Actuation," Masters Thesis, University of Maryland, College Park, 2009 (11 pages).

(Continued)

*Primary Examiner* — Scott W Dodds
(74) *Attorney, Agent, or Firm* — Pauly, DeVries Smith & Deffner LLC

(57) ABSTRACT

A method for producing a Fiber Metal Laminate component of an airplane, using a manipulator system with an end effector and a control, wherein at least one metal layer and at least one unhardened fiber layer are being stacked onto each other in a mould in a stacking sequence, wherein each stacking cycle comprises picking up a metal layer or a fiber layer from a supply stack according to the stacking sequence, transporting the layer to the mould, placement of the layer at a deposition surface in the mould and depositing the so placed layer onto the deposition surface. After being picked up from the supply stack and before being deposited onto the deposition surface the layer to be stacked can be (Continued)

deformed by the end effector as to adapt the form of the layer to the form of the deposition surface.

14 Claims, 3 Drawing Sheets

(51) Int. Cl.
| | |
|---|---|
| *B29C 70/38* | (2006.01) |
| *B29C 70/54* | (2006.01) |
| *B32B 15/14* | (2006.01) |
| *B32B 5/02* | (2006.01) |
| *B32B 15/04* | (2006.01) |
| *B32B 7/12* | (2006.01) |
| *B32B 38/18* | (2006.01) |
| *B32B 15/20* | (2006.01) |
| *B29C 31/08* | (2006.01) |
| *B32B 1/00* | (2006.01) |
| *B32B 37/18* | (2006.01) |
| *B29K 277/00* | (2006.01) |
| *B29K 309/08* | (2006.01) |
| *B29K 705/00* | (2006.01) |
| *B29L 31/30* | (2006.01) |

(52) U.S. Cl.
CPC ............ *B29C 31/085* (2013.01); *B29C 70/38* (2013.01); *B29C 70/541* (2013.01); *B32B 1/00* (2013.01); *B32B 5/02* (2013.01); *B32B 7/12* (2013.01); *B32B 15/04* (2013.01); *B32B 15/14* (2013.01); *B32B 15/20* (2013.01); *B32B 37/182* (2013.01); *B32B 38/1858* (2013.01); *B32B 38/1866* (2013.01); *B25J 15/0625* (2013.01); *B29K 2277/10* (2013.01); *B29K 2309/08* (2013.01); *B29K 2705/00* (2013.01); *B29L 2031/3076* (2013.01); *B32B 2038/1891* (2013.01); *B32B 2255/06* (2013.01); *B32B 2260/021* (2013.01); *B32B 2260/023* (2013.01); *B32B 2260/046* (2013.01); *B32B 2262/0269* (2013.01); *B32B 2262/101* (2013.01); *B32B 2262/106* (2013.01); *B32B 2305/076* (2013.01); *B32B 2305/77* (2013.01); *B32B 2307/714* (2013.01); *B32B 2307/732* (2013.01); *B32B 2311/00* (2013.01); *B32B 2315/08* (2013.01); *B32B 2377/00* (2013.01); *B32B 2605/18* (2013.01); *B32B 2607/00* (2013.01)

(56) References Cited

U.S. PATENT DOCUMENTS

| | | | |
|---|---|---|---|
| 3,281,107 | A | 10/1966 | Lewis |
| 3,367,764 | A | 2/1968 | Seymour |
| 3,734,464 | A | 5/1973 | Bushnell |
| 3,826,485 | A | 7/1974 | Shindo |
| 3,865,359 | A | 2/1975 | Caroli |
| 4,129,328 | A | 12/1978 | Littell |
| 4,297,118 | A | 10/1981 | Kellar et al. |
| 4,470,835 | A | 9/1984 | Fecik et al. |
| 4,487,623 | A | 12/1984 | Claassen et al. |
| 4,527,783 | A | 7/1985 | Collora et al. |
| 4,579,271 | A | 4/1986 | Fujita et al. |
| 4,579,577 | A | 4/1986 | Claassen |
| 4,741,751 | A | 5/1988 | Claassen et al. |
| 4,746,348 | A | 5/1988 | Frank |
| 4,775,290 | A | 10/1988 | Brown et al. |
| 4,793,657 | A | 12/1988 | Mense |
| 4,806,070 | A | 2/1989 | Poux et al. |
| 4,806,140 | A | 2/1989 | Krug et al. |
| 4,822,398 | A | 4/1989 | Mcmaster et al. |
| 5,578,153 | A | 11/1996 | Hill |
| 5,865,089 | A | 2/1999 | Langer et al. |
| 6,431,623 | B1 | 8/2002 | Roeters et al. |
| 6,467,824 | B2 | 10/2002 | Bolotin et al. |
| 6,495,086 | B1 | 12/2002 | Uytterhaeghe et al. |
| 6,641,131 | B2 * | 11/2003 | Stohr .................. B65H 3/0883 271/107 |
| 6,666,127 | B2 | 12/2003 | Peles |
| 6,868,773 | B2 | 3/2005 | Davis et al. |
| 7,444,742 | B2 | 11/2008 | Sturm, Jr. et al. |
| 7,464,548 | B2 | 12/2008 | Yson et al. |
| 7,607,380 | B2 | 10/2009 | Hiramatsu et al. |
| 7,632,452 | B2 | 12/2009 | Saijo et al. |
| 9,205,558 | B1 * | 12/2015 | Zevenbergen ......... B25J 9/1633 |
| 9,821,474 | B2 | 11/2017 | Reinhold et al. |
| 2002/0083828 | A1 | 7/2002 | Bernier |
| 2005/0042323 | A1 | 2/2005 | Habisreitinger et al. |
| 2005/0263949 | A1 | 12/2005 | Boyl-Davis et al. |
| 2007/0129653 | A1 | 6/2007 | Sugar et al. |
| 2008/0080962 | A1 | 4/2008 | Holtmeier |
| 2009/0324366 | A1 | 12/2009 | Okazaki |
| 2010/0007065 | A1 * | 1/2010 | Reinhold ................ B29C 70/44 264/511 |
| 2010/0025532 | A1 | 2/2010 | Herrmann et al. |
| 2011/0159764 | A1 * | 6/2011 | Price ...................... B32B 15/14 442/228 |
| 2011/0256370 | A1 | 10/2011 | Roebroeks et al. |
| 2012/0330453 | A1 * | 12/2012 | Samak Sangari ...... B25J 19/023 700/121 |
| 2014/0199153 | A1 * | 7/2014 | Reinhold ............. B65H 3/0816 414/800 |
| 2014/0367037 | A1 * | 12/2014 | Metschan ........... B32B 38/1858 156/285 |

FOREIGN PATENT DOCUMENTS

| | | |
|---|---|---|
| DE | 102007003275 | 7/2008 |
| DE | 102012000508 | 7/2013 |
| WO | 2017005770 | 1/2017 |

OTHER PUBLICATIONS

"Festo Group, Fluidic Muscle DMSP/MAS Product Brochure," www.festo.com, Jun. 2008 (34 pages).
File History for U.S. Appl. No. 14/124,551 downloaded Mar. 20, 2018 (395 pages).
"German Search Report," for Priority Application No. 102015009177.8 dated Sep. 21, 2016 (4 pages).
"International Preliminary Report on Patentability," for PCT Application No. PCT/EP2016/065929 dated Jan. 9, 2018 (7 pages).
"International Search Report and Written Opinion," for PCT Application No. PCT/EP2016/065929 dated Sep. 28, 2016 (12 pages).
"International Search Report," International Search Report from International Application No. PCT/EP2012/001347, corresponding to this U.S. Appl. No. 14/124,551, dated Nov. 5, 2012, 2 pages.
"Decision of Rejection," for Chinese Application No. 201680040641.7 dated Jun. 25, 2021 (7 pages) English Translation Only.
"Communication Pursuant to Article 94(3) EPC," for European Patent Application No. 16736114.6 mailed May 12, 2021 (6 pages).

* cited by examiner

METHOD FOR PRODUCING A FIBER METAL LAMINATE COMPONENT OF AN AIRPLANE

CROSS-REFERENCE TO RELATED APPLICATIONS

This application is a national stage application under 35 U.S.C. 371 of International Patent Application Serial No. PCT/EP2016/065929, entitled "METHOD FOR PRODUCING A FIBER LAMINATE COMPONENT OF AN AIRPLANE," filed Jul. 6, 2016, which claims priority from German Patent Application No. DE 10 2015 009 177.8, filed Jul. 9, 2015, the disclosure of which is incorporated herein by reference.

FIELD OF THE TECHNOLOGY

The disclosure is directed to a method for producing a Fiber Metal Laminate component of an airplane as well as to a manipulator system.

BACKGROUND

The material class of Fiber Metal Laminate (FML) has increasingly been applied for the realization of airplane components, in particular of structural airplane components. The reason for this is that with Fiber Metal Laminates extraordinary mechanical properties may be achieved with extremely lightweight design. A Fiber Metal Laminate comprises metal layers and fiber layers stacked onto each other and bound by a normally thermoset resin.

The manufacturing process of Fiber Metal Laminate components of an airplane is complex as the layers to be stacked onto each other are flexible at least as far as the fiber layers are concerned. Due to the flexibility of the layers it is challenging to achieve stable handling processes during stacking up the layers onto each other. Another challenge is to prevent the generation of cavities, when one layer is stacked onto another layer.

For the reasons noted above the manufacturing process is largely performed manually. However, approaches have been made to introduce an automated manufacturing process for Fiber Metal Laminate components of an airplane. The known method (DE 10 2012 000 508 A1), which is the starting point of the disclosure, relies on a manipulator system with one end effector for handling the metal layers and with a second end effector for handling the fiber layers. With this manipulator system the respective layers are being stacked onto each other in a mould in a stacking sequence. Each stacking cycle comprises picking up a layer from a supply stack, transporting the layer to the mould, placement of the layer at a deposition surface in the mould and depositing the so placed layer onto the deposition surface.

In order to prevent a building up of cavities during stacking up the layers, the layers are being fixed to the mould by electrostatic charging.

While the known method generally allows automatic manufacturing of Fiber Metal Laminate components of an airplane, the drawback of this approach is the high complexity of the resulting manufacturing system and as a result the high costs involved with setting up such a manufacturing system.

SUMMARY

It is the objective of the disclosure to improve the known method as to achieve a stable automated manufacturing process with a manufacturing system of low complexity.

The above noted objective is achieved for a method as described herein.

The idea underlying the disclosure is to adapt the form of the layer to be stacked to the form of the mould, before the respective layer is being deposited. With this it is possible that a flat contact is achieved between the surface of the layer and the surface of the deposition surface. With such contact the buildup of cavities may be prevented or at least effectively be reduced.

In detail it is proposed that after being picked up from the supply stack and before being deposited onto the position surface the layer to be stacked is being deformed by the end effector as to adapt the form of the layer to the form of the deposition surface. It has been found that the above noted deforming of the layer may be achieved by the end effector itself. This can be beneficial as no additional tool is necessary for deforming and also as no additional handling step is necessary for adapting the form of the layer to the deposition surface.

Various embodiments provide improved gripping of the layer to be stacked via a gripping arrangement. The gripping arrangement can at least partly provided a floating grip of the layer along its surface such that during the proposed deformation of the layer no undesired mechanical tension is building up within the layer.

Various embodiments are directed to deforming the respective layer with low mechanical complexity.

The general idea underlying some embodiments is to pick up and deform the respective layer via one and the same end effector. It has been found that especially when using suction gripping elements for the gripping arrangement it is well possible to even use one and the same gripping element to grip a metal layer as well as a fiber layer. Opposite to what is taught in the state of the art it is now possible to handling metal layers and fiber layers with one and the same end effector, such that the respective end effector may be applied in an particularly effective way.

Various embodiments allow an air pocked free deposition of the respective layer as a completely flat contact may be established between the surface of the layer and the deposition surface.

However, depending on the design of the mould it may be advantageous that the form of the layer before its deposition at least slightly deviates from the form of the deposition surface. This may prevent the build up of friction between the layer and the deposition surface during placement of the layer into the mould. Such friction may again lead to the build up of the undesired cavities between the layers.

According to some embodiments, a manipulator system for performing the proposed method is disclosed. Reference is made to all explanations even regarding the proposed method, as far as those explanations are suitable to describe the manipulator system.

An embodiment provides a method for producing a Fiber Metal Laminate component of an airplane, comprising using a manipulator system with an end effector and a control assigned to the manipulator system, wherein at least one metal layer and at least one unhardened fiber layer are being stacked onto each other in a mould by the manipulator system in a stacking sequence, wherein each stacking cycle comprises picking up a metal layer or a fiber layer from a respective supply stack according to the stacking sequence, transporting the layer to the mould, placement of the layer at a deposition surface in the mould according to the stacking sequence and depositing the so placed layer onto the deposition surface, wherein after being picked up from the supply stack and before being deposited onto the deposition surface the layer to be stacked is being deformed by the end effector as to adapt the form of the layer to the form of the deposition surface.

In some embodiments, the manipulator system comprises a manipulator, such as a robot with sequential axes or a portal robot, which manipulator is being driven by the control.

In some embodiments, the end effector comprises a gripping arrangement, such as a number of gripping elements, for gripping the layer during pick up, which gripping arrangement is being activated by the control, such that the gripping elements are being activated separately or in groups by the control.

In some embodiments, the gripping arrangement comprises at least one gripping element of a first type and at least one gripping element of a second type, such as the gripping element of the first type provides a floating grip of the layer along its surface and that the gripping element of the second type provides a stiff grip of the layer.

In some embodiments, the gripping elements are suction gripping elements, such as at least one of the gripping elements is of the type of Bernoulli suction gripping element, and/or, that at least one of the gripping elements is of the type of Venturi suction gripping element.

In some embodiments, the end effector comprises a deformable carrier arrangement, that the gripping arrangement is located on the carrier arrangement, that the end effector also comprises an actuator arrangement for actuator based deforming of the carrier arrangement and that for deforming the gripped layer the actuator arrangement is being driven by the control, such as the actuator arrangement comprises at least two actuators, such as at least two linear actuators, that are driven by the control, in particular of the type of a pneumatic muscle and/or of the type of a pneumatic piston drive, such as the actuator arrangement comprises at least two actuators of different type.

In some embodiments, the layers to be stacked are provided as flat precut layers in the supply stack.

In some embodiments, at least one metal layer and at least one fiber layer are each being picked up and deformed via one and the same end effector.

In some embodiments, at least one operating parameter of the end effector is being adapted by the control depending of the layer being a metal layer or a fiber layer.

In some embodiments, during deforming the layer to be stacked, different gripping elements are being activated by the control depending of the layer being a metal layer or a fiber layer.

In some embodiments, within the fiber layers the fibers are oriented homogeniously, such as all fibers are basically aligned to one direction, and/or, that at least two fiber layers are being deposited onto each other in different fiber orientations.

In some embodiments, the fiber layer and the metal layer are being deformed in at least two kartesian dimensions, such as the fiber layer and the metal layer are being deformed in three kartesian dimensions, and/or, that the fiber layer and the metal layer are being deformed by bending around at least one bending axis, such as the at least one bending axis is arranged basically parallel to the surface of the respective layer.

In some embodiments, the placement of the layer to be stacked goes along with the layer contacting the deposition surface along a contact line or a contact point, or, that the placement of the layer to be stacked goes along with the layer evenly contacting the full deposition surface, or, that the placement of the layer to be stacked goes along with the layer floating directly above the deposition surface.

In some embodiments, the deformation of the layer to be stacked by the end effector before its deposition is performed such that the form of the layer is identical to the form of the deposition surface.

In some embodiments, the deformation of the layer to be stacked by the end effector before its deposition is performed such that the form of the layer at least slightly deviates from the form of the deposition surface, such as the deformation of the layer to be stacked by the end effector before its deposition is performed such that in case of a convex deposition surface the layer is less convex than the deposition surface and that in case of a concave deposition surface the surface of the layer is more concave than the deposition surface.

An embodiment provides a manipulator system for performing the method as described herein.

BRIEF DESCRIPTION OF THE DRAWINGS

In the following, various embodiments will be described based on an example with reference to the drawings. In the drawings

DETAILED DESCRIPTION

Figure 1:
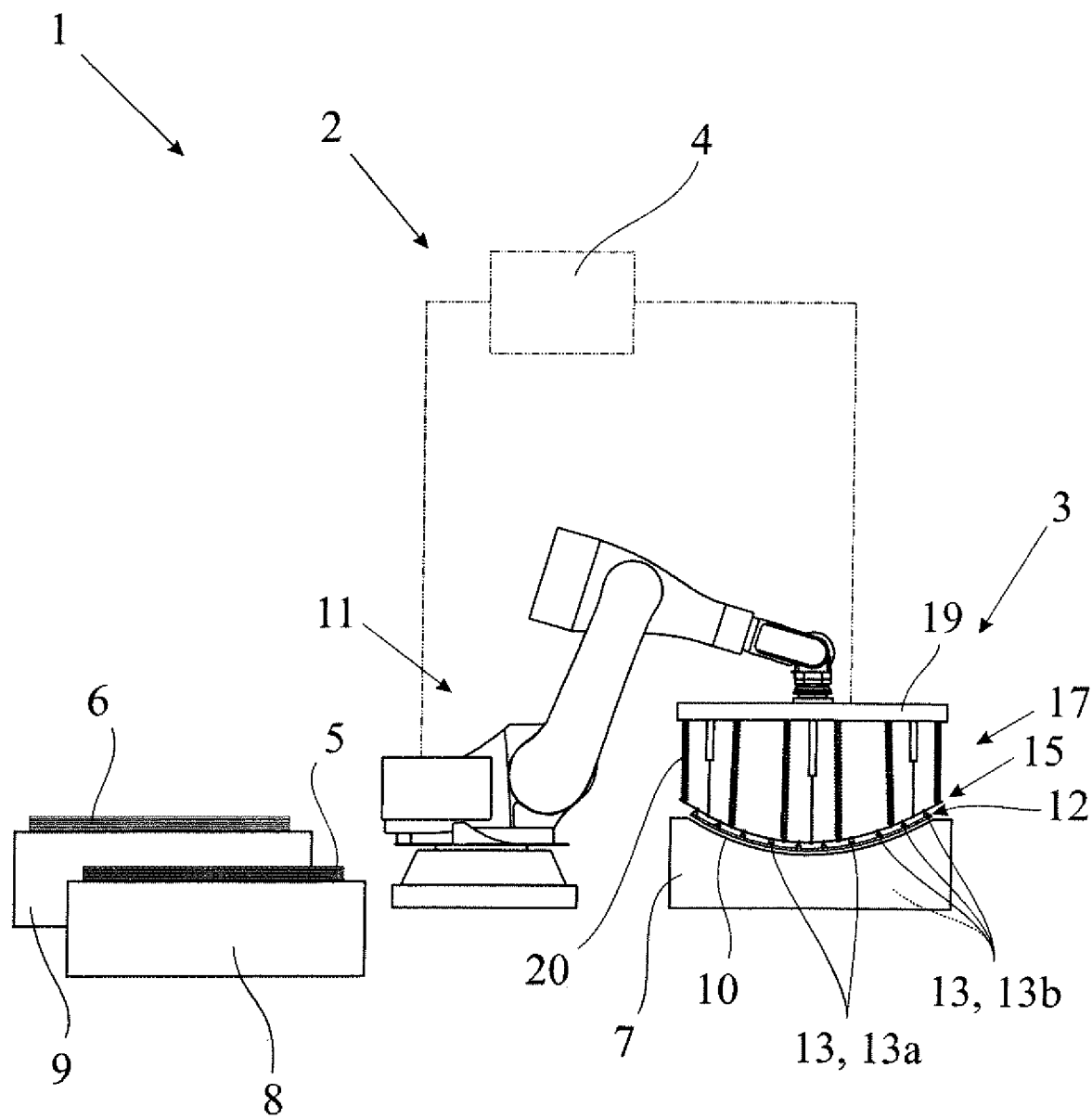
FIG. 1 shows a proposed manufacturing system for performing the proposed method.

The manufacturing system 1 shown in the drawings serves for producing a Fiber Metal Laminate component of an airplane. In some embodiments, such component is part of a structural component of an airplane, in particular part of a fuselage or wing of an airplane. Here the component can be part of the outer skin of the fuselage. The component is accordingly of half shell shape.

The manufacturing system 1 comprises a manipulator system 2 with an end effector 3 and a control 4 assigned to the manipulator system 2. The control 4 is an electronic control which controls not only the movement of the manipulator system 2 but also the actions of the end effector 3. The manufacturing system 1 here can be structured as a robot cell.

During manufacturing at least one metal layer 5 and at least one unhardened fiber layer 6 are being stacked onto each other in a mould 7 by the manipulator system 2 in a stacking sequence. The kind of layers 5, 6 and the stacking sequence depends on the kind of Fiber Metal Laminate material, the resulting component shall be made off. The metal layer 5 may be any kind of metal sheet, the fiber layer 6 may be any kind of fiber sheet, which may be of dry fiber material or preimpregnated fiber material, also known as prepreg.

The Fiber Metal Laminate component can be a so called GLARE® material (Glass Laminate Aluminium Reinforced Epoxy). Here the metal layer 5 is at least partly an aluminium layer. Other metal materials such as titanium may be applied as well. Normally the outer layers of the Fiber Metal Laminate component are metal layers 5. The thickness of the metal layers is below 1.0 mm, such as between 0.2 mm and 0.5 mm, further between 0.3 mm and 0.4 mm. For prevention of corrosion it is anodized. In order to provide good bonding characteristics it is further coated with an appropriate primer.

The fiber layer 6 may be of prepreg fiber material or dry fiber material, which during manufacturing is in any case unhardened. It may comprise different kind of fibers such as glass fibers, aramid fibers or the like.

Additionally to the handling of metal layers 5 or fiber layers 6 also adhesive tape layers can be handled and deposited between two metal layers 5 or between two fiber layers 6 or a fiber layer 6 and a metal layer 5. In some embodiments, if two metal layers 5 are deposited onto each other partly overlapping, an adhesive tape layer is positioned in the overlapping region in between the two metal layers 5. The adhesive tape layer can provide a sealing between the respective two layers.

Each stacking cycle comprises picking up a metal layer 5 or a fiber layer 6 or an adhesive tape layer from a respective supply stack 8 according to the respective stacking sequence. Here, two supply stacks 8, 9 can be provided. One supply stack 8 for providing the metal layer 5 and one supply stack 9 providing the fiber layer 6. Both types of layers 5, 6 can also be supplied on one supply stack. Whether the metal layer 5 is being picked up from the supply stack 8 or a fiber layer 6 is being picked up from supply stack 9 depends on the stacking sequence which largely depends on the layer structure of the Fiber Metal Laminate component to be manufactured. The picking up of the respective layer is shown in FIG. 2a.

Subsequently within the stacking cycle the picked up a layer 5, 6 is being transported to the mould as shown in FIG. 2b. The transportation of the layer 5, 6 is followed the placement of the layer 5, 6 at a deposition surface 10 in the mould 7 according to the stacking sequence which again is followed by depositing the so placed layer 5, 6 onto the deposition surface 10, as shown in FIG. 2d. The deposition surface 10 may be the surface of the mould 7 or the surface of the respective layer 5, 6 that has been stacked in the previous stacking cycle. Accordingly the exact location of the deposition surface 10 depends on the stacking sequence. In any case the form of the deposition surface 10 is largely defined by the form of the mould 7.

Depending on the fiber metal laminate components to be produced the mould 7, respectively the deposition surface 10, may have a convex and/or a concave form. The mould 7, respectively the deposition surface 10, may have both convex as well as concave sections, for example when fiber metal laminate components for the airplane sections between the fuselage and the wing are to be produced.

In various embodiments, after being picked up from the supply stack 8, 9 and before being deposited onto the deposition surface 10 the layer 5, 6 to be stacked is being deformed by the end effector 3 as to adapt the form of the layer 5, 6 to the form of the deposition surface 10. This is shown in FIG. 2c. Here the deposition surface is of concave form, to which the layer 5, 6 is being adapted by the end effector 3.

It may be pointed out that the step of deforming the respective layer 5, 6 may take place at any time between picking up the layer 5, 6 and depositing the layer 5, 6. In an embodiment of the proposed method the deforming step is being performed while the manipulator system 2 is being moved, in particular during the transporting step. However, it may be advantageous to stop the movement of the manipulator system 2 for the deforming step, for example in order to achieve a higher accuracy in deforming. The potential advantages of providing a deforming step has been explained in the general part of the specification. The possibility of preventing cavities between layers 5, 6 becomes especially apparent when looking at FIG. 2c, d.

It is generally possible for the manipulator system 2 to comprise more than one end effector 3, for example if certain process steps are to be performed in parallel. All explanations given for the one shown end effector 3 are fully applicable to a manipulator system 2 with two or more than two end effectors 3.

The manipulator system 2 shown in the drawings comprises a manipulator 11, which is being driven by the control 4. Here the manipulator 11 can be a robot with sequential axes. It may also be a robot with any kind of other kinematic, for example the kinematic of a portal robot. The manipulator 11 may as well be a construction which is tailored to the manufacturing process explained above.

The end effector 3 can include a gripping arrangement 12 for gripping the layer 5, 6 during pick up. The gripping arrangement 12 includes a number of gripping elements 13 which each provide a localized gripping interaction with the respective layer 5, 6. The gripping arrangement 12 defines a gripping plane 14, along which the gripping interaction with the respective layer 5, 6 is possible. The gripping elements 13 are distributed across the gripping plane 14 of the gripping arrangement 12.

The gripping arrangement 12 is being activated by the control 4. The activation of the gripping arrangement 12 does not only include turning on and off a gripping interaction but also adjusting operating parameters of the end effector 3 as will be noted below.

In various embodiments, while the gripping elements 13 are distributed across the gripping plane 14, the gripping elements 13 are being activated separately or in groups by the control 4. With this it is possible to selectively activate the gripping elements 13, for example in order to prevent unused gripping elements 13 to undesirably interact with already deposited layers 5, 6. It is possible to handle layers 5, 6 smaller than the outline of the gripping arrangement 12.

Figure 3:
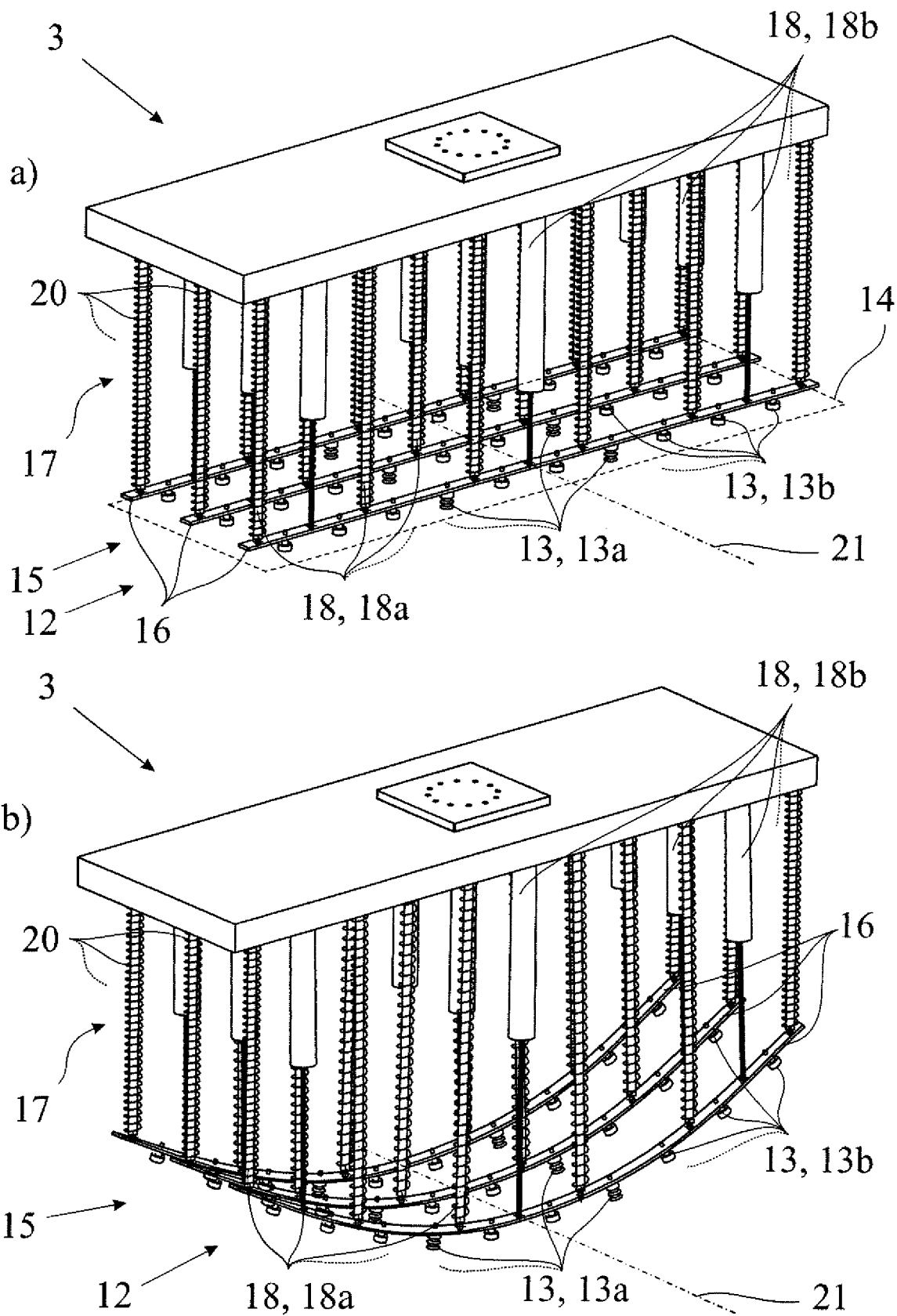
FIG. 3 shows the end effector of the manipulator system of FIG. 1 in its demounted state, a) in a configuration according to FIGS. 2a and 2b and b) in a configuration according to FIGS. 2c and 2d.

As may be seen from FIG. 3 the gripping arrangement 12 comprises at least one gripping element 13a, such as a number of gripping elements 13a, of a first type and at least one gripping element 13b, such as a number of gripping elements 13b, of a second type. This generally provides an increase of flexibility of the gripping arrangement 12, as different gripping characteristics may be set by the control 4. In the embodiment shown in FIG. 3 the gripping element 13a of the first type provided a floating grip of the layer 5, 6 along its surface such that the gripping forces only act perpendicular to the surface of the layer 5, 6 and are only minimal in the direction along the surface of the layer 5, 6. This allows a compensation movement between the layer 5, 6 with respect to the gripping arrangement 12 during deformation such that undesired attention within the layer 5, 6 is prevented. In order to define the position of the layer 5, 6 along its surface the gripping element 13b of the second type provides a stiff grip of the layer 5, 6. For an unambiguous definition of the position of the layer 5, 6 at least two gripping elements 13b of the second type are necessary, which are located at a certain distance to each other. With this distance it is possible for the gripping arrangement to provide a support of the layer 5, 6 also in view of possible rotation of the layer 5, 6.

There are various possibilities possible for realizing the gripping elements 13 of the gripping arrangement 12. Examples are pincer grippers, needle grippers, freezing grippers or the like. Here, however, the gripping elements are suction gripping elements. In particular, the gripping elements 13a of the first type are Bernoulli suction gripping elements, while the gripping elements 13b of the second type are Venturi suction gripping elements. The application of suction gripping elements can be advantageous as damaging of the layers 5, 6 may effectively prevented, as can be of particular importance for airplane components As noted above the deformation of the layer 5, 6 is being performed by the end effector 3 itself. For this the end effector 3 comprises a deformable carrier arrangement 15, which the gripping arrangement 12 is located on. Here the carrier arrangement can include bendable carrier strips 16 which the gripping elements 13 are located on.

The end effector 3 also comprises an actuator arrangement 17 for actuator based deforming of the carrier arrangement 15. For deforming the gripped layer 5, 6 the actuator arrangement 17 is being driven by the control 4. This becomes a parent from a comparison of FIG. 3a and FIG. 3b.

FIG. 3 also shows that the actuator arrangement 17 comprises at least two actuators 18, here and preferably a number of actuators 18, that are driven by the control 4.

The realization of the actuator arrangement 17 is possible in various advantageous ways. Here the actuators 18 of the actuator arrangement 17 can be linear actuators, that are driven by the control 4 respectively. Here the actuators 18 can be partly of the type of a pneumatic muscle and partly of the type of a pneumatic piston drive. Accordingly the actuator arrangement 17 comprises at least two actuators 18 of different type. The actuators 18 of the type of a pneumatic muscle are denominated with reference number 18a, while the actuators 18 of the type of a pneumatic piston drive are denominated with reference number 18b. With the actuators 18a of the first type, exact pulling forces may be introduced into the carrier arrangement 15, at the same time providing a certain elasticity. With the actuators 18b of the second type pulling forces and pushing forces may be introduced into the carrier arrangement 15, such that the actuators 18b of the second kind provide supporting points for the forces generated by the actuators 18a of the first kind. With this combination of actuators 18a, 18b interacting with each other a high flexibility and at the same time accuracy in deformation of the carrier arrangement 15 and their risk of the gripped layer 5, 6 is possible.

Regarding the detailed construction shown in FIG. 3 the above noted application of actuators 18 of different type can be advantageous as the actuators 18 are each acting on the carrier arrangement 15, here on the carrier strips 16, mainly in a perpendicular direction with respect to the gripping plane 14, which the carrier strips 16 are aligned to. The actuators 18 are arranged in one or more rows and are attached to an interface arrangement 19 at their respective one ends and to the carrier arrangement 15, here the carrier strips 16, on their respective other ends. At least one of the actuators 18 is provided with a return spring 20 that may be a coil spring aligned to the longitudinal extension of the linear actuator 18.

Further constructional details regarding the gripping arrangement 12 may be taken from US 2014/0199153 A1, which goes back on the applicant and which is hereby incorporated herein by reference.

The application of the shown gripping arrangement 12 for the proposed manipulator system 2 allows an extraordinary amount of flexibility. This is particularly true because depending from driving the above noted actuators 18 by the control 4 the carrier arrangement 15 may be brought into different forms. This includes convex forms, concave forms and combinations of those. Also the degree of deformation of the carrier arrangement 15 and therewith of the respective layer 5, 6 may be changed on a continuous scale. As the deformation may be achieved actuator based as noted above, it is possible with no effort to change the deformation at any time during production, in particular between two stacking cycles.

As a consequence, it is possible to change the mould 7 for the production of one Fiber Metal Laminate component to another mould 7 for the production of another Fiber Metal Laminate component with a different geometry of the mould 7. This may be done without having to adapt the manipulator system 2 mechanically. In order to produce different Fiber Metal Laminate components changes have only to be made in and/or by the control 4. In particular the control 4 changes the drive movement of the manipulator and/or the drive movement of the actuators 18 and/or the operating parameters of the gripping arrangement 12.

A potential advantage of the proposed method and the proposed manipulator system 2 is the fact that it is possible to provide the layers 5, 6 to be stacked as flat precut layers in the respective supply stack 8, 9. As deforming the layers 5, 6 is provided by the end effector 3 it is not necessary to have the layers 5, 6 provided in the supply stack 8, 9 as already preformed layers 5, 6. This makes the logistics of the manufacturing process less complex and as a result cost effective. The outlines of the respective layers 5, 6 may vary to each other. In particular, the outlines of the precut metal layers 5 and the precut fiber layers 6 may vary to each other. In some embodiments, the end effector 3 handles layers 5, 6 of different width and/or length during the production of the fiber metal laminate component. The width and/or the length of the metal layers 5 in comparison to the width, respectively the length of the fiber layers 6, may vary during the production of one fiber metal laminate component from one stacking cycle to the next stacking cycle. In some embodiments, the surface area of the fiber layers 6 is smaller than the surface area of the metal layers 5. Additionally or alternatively the surface area of different metal layers 5 or different fiber layers 6 may vary from one stacking cycle to the next stacking cycle.

An increase of effectiveness is also achieved by the fact that at least one metal layer 5 and at least one fiber layer 6, here all metal layers 5 and all fiber layers 6, are each being picked up and deformed via one and the same end effector 3. Accordingly it has been found that generally it is not necessary to have different end effectors 3 for the different layers of the Fiber Metal Laminate component. This is particular true for those layers of above noted GLARE® materials. During manufacturing it is possible to optimize various operating parameters by the control 4. Here at least one operating parameter of the end effector 3 can be adapted by the control 4 depending on the layer 5, 6 being a metal layer or a fiber layer. In particular it can be that depending on the layer 5, 6 to be handled, different gripping forces may be set by the control 4.

Another adaption of an operating parameter is that during deforming the layer 5, 6 to be stacked, different gripping elements 13 are being activated by the control 4 depending on the layer 5, 6 being a metal layer 5 or a fiber layer 6. It has been noted above that it is well possible to activate the gripping elements 13 separately or in groups by the control 4. In particular it can be that during transporting and/or deforming of the fiber layers 6 a different number of gripping elements are activated then during transporting and/or forming of the metal layers 5, 6. It may also be pointed out that the surfaces of the layers 5, 6 to be stacked are normally smaller than the surface of the mould 7. Accordingly stacking of the layers 5, 6 means building up a tile structure across the mould surface.

A potential advantage of a Fiber Metal Laminate structure is that specific mechanical properties may be set, which mechanical properties may depend on the direction of force introduced into the structure. This may be achieved simply by placing the fiber layers 6 in specific orientations.

In some embodiments, within the fiber layers 6 the fibers are oriented homogeneously. In some embodiments, all fibers are basically aligned to one direction. With this it is easily possible to define the above noted mechanical properties by depositing at least two fiber layers 6 onto each other in different fiber orientations.

Depositing at least two fiber layers 5, 6 onto each other in different fiber orientations may, however, also be advantageous if the fiber layer 6 is of the type of knitted fabrics of interlaced fabrics or the like.

It can be that at least one fiber layer 6 is stacked onto another fiber layer 6 such that the fiber orientations of the two layers 6 are offset to each other by 90°. In the manufacturing process this means that the first fiber layer 6 is deposited at a first angle and that the second fiber layer 6 is deposited at a second angle, while the first angle and the second angle are not identical. In some embodiments, the difference between the two angles is above 10°, such as above 45°, such as 45° and such as 90°. The complete ranges of angles for depositing the layers 5, 6 may be realized by the proposed manipulator system 2 simply by turning the end effector 3 via the manipulator 11 accordingly.

There may be a different freedom in deformation of the layers 5, 6 depending on the complexity of the component to be manufactured. Here the fiber layer 5 and the metal layer 6 can be deformed in at least two Cartesian dimensions. It may even be possible that the fiber layer 5 and the metal layer 6 are being deformed in three Cartesian dimensions. Here the fiber layer 5 and the metal layer 6 can be deformed by bending around at least one bending axis, which bending axis is roughly indicated in FIG. 3. Further the bending axis 21 can be arranged basically parallel to the surface of the respective layer 5, 6 and there is basically parallel to the gripping plane 14, as may be taken from FIG. 3 as well.

Figure 2:
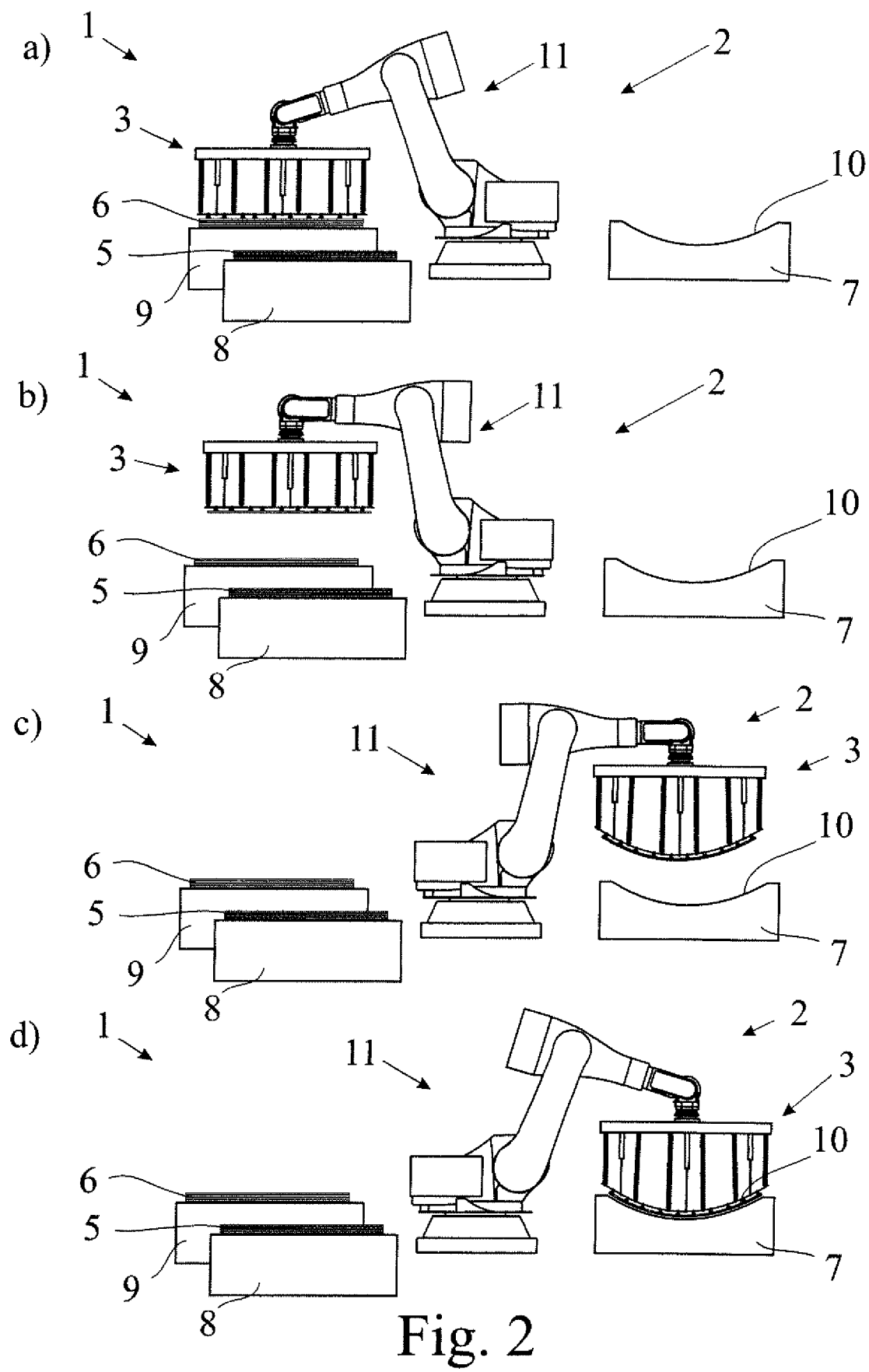
FIG. 2 shows various steps of the proposed method a) picking up a layer, b) transporting the layer, c) transporting and deforming the layer and d) placement of the layer before its deposition

The placement of the layer 5, 6 to be stacked, which precedes depositing the layer 5, 6 onto the deposition surface 10 may be performed in various advantageous ways. In a first embodiment the placement of the layer 5, 6 to be stacked goes along with a layer 5, 6 contacting the deposition surface 10 along a contact line or a contact point. In some embodiments, the contact line or the contact point is a single contact line or a single contact point. With this, depending on the form of the mould 7, the build up of cavities may be prevented. As an alternative, the placement of the layer 5, 6 to be stacked goes along with the layer 5, 6 evenly contacting the full deposition surface. This is shown in FIG. 2. As the manufacturing system shown in the drawings provides a high accuracy in positioning of the end effector 3, the flat contact between the surface of the layer 5, 6 and the deposition surface 10 prevents the build up of cavities. As another alternative the placement of the layer 5, 6 to be stacked goes along with the layer 5, 6 floating directly above the position surface 10. The layer 5, 6 is vaguely dropped onto the deposition surface 10. Due to the very short dropping distance and the above noted adaption of the form of the layer 5, 6 to the form of the deposition surface 10, also with this alternative the build up of cavities is prevented.

The proposed deforming of the respective layer may be performed in various ways, which may be advantageous depending on the form of the mould 7.

In a first embodiment the deformation of the layer 5, 6 to be stacked by the end effector 3 before its deposition is performed such that the form of the layer 5, 6 is identical to the form of the deposition surface. This is shown in FIG. 2.

It may also be advantageous that the deformation of the layer 5, 6 to be stacked by the end effector 3 before its deposition is performed such that the form of the layer 5, 6 at least slightly deviates from the form of the deposition surface 10. This may be advantageous if any friction shall be prevented during the placement of the layer 5, 6 at the deposition surface 10. In case of a convex deposition surface 10 this is realized that the deformation of the layer 5, 6 is performed such that the layer 5, 6 is less convex than the deposition surface 10. In case of a concave deposition surface 10 (FIG. 1) this may be done by deformation of the layer 5, 6 such that the surface of the layer 5, 6 is more concave than the deposition surface 10. For other designs of the mould 7 this principle may be applied accordingly.

After the above noted stacking of the layers 5, 6 onto each other the stacked up arrangement can be compressed in order to i. a. further reduce possible cavities. In some embodiments, together with the mould 7 the stacked up arrangement can then be transferred into an autoclave, in which it is being heated under pressure, activating the matrix of the fiber layers 6 as far as those fiber layers 6 are of prepreg material. This heat treatment is being performed for 3 to 10 hours under a high pressure of about 10 bar. Subsequent heat or pressure treatments may follow according to the layer material applied. It may be pointed out that if the fiber layers 6 are of dry fiber material they might be impregnated after each placement or the matrix material might be applied to the fiber layers 6 before the autoclave.

According to a second teaching, the manipulator system 2 for performing the proposed method is disclosed. As noted above, the manipulator system 2 comprises an end effector 3 and is controllable by the control 4. All explanations given with respect to the proposed method are fully applicable to the proposed manipulator system 2.

The invention claimed is:

1. A method for producing a Fiber Metal Laminate component of an airplane, comprising:

using a manipulator system with an end effector and a control assigned to the manipulator system, stacking at least one metal layer and at least one unhardened fiber layer onto each other in a mould by the manipulator system in a stacking sequence, wherein each stacking cycle of the stacking sequence comprises:

picking up one of the metal layers or the unhardened fiber layers from a respective supply stack as a layer to be stacked according to the stacking sequence, adapting, via the control, at least one operating parameter of the end effector depending on whether the layer to be stacked is one of the metal layers or one of the unhardened fiber layers, transporting the layer to be stacked to the mould, placing the layer to be stacked at a deposition surface in the mould, depositing the so placed layer to be stacked onto the deposition surface, and deforming, with the end effector, the layer to be stacked after the layer to be stacked is picked up from the supply stack and before the layer to be stacked is placed onto the deposition surface so as to adapt the form of the layer to be stacked to the form of the deposition surface, wherein both the metal layers and the unhardened fiber layers can be deformed by the end effector, wherein the end effector comprises a number of gripping elements for gripping the layer to be stacked during pick up, and wherein the gripping elements are activated separately or in groups by the control.

2. The method according to claim 1, wherein the manipulator system comprises a manipulator driven by the control.

3. The method according to claim 2, wherein the manipulator comprises a robot with sequential axes or a portal robot.

4. The method according to claim 1, wherein the gripping elements comprise at least one gripping element of a first type and at least one gripping element of a second type.

5. The method according to claim 4, wherein the gripping element of the first type provides a floating grip of the layer to be stacked and wherein the gripping element of the second type provides a stiff grip of the layer to be stacked.

6. The method according to claim 1, wherein the gripping elements are suction gripping elements.

7. The method according to claim 6, wherein at least one of the gripping elements is a Bernoulli-type suction gripping element or gripping element.

8. The method according to claim 1, wherein the end effector comprises a deformable carrier arrangement, wherein the gripping elements are located on the deformable carrier arrangement, wherein the end effector also comprises an actuator arrangement for actuator based deforming of the deformable carrier arrangement, wherein the actuator arrangement comprises at least two actuators that are driven by the control.

9. The method according to claim 1, wherein the metal and unhardened fiber layers are provided as flat precut layers in the supply stacks.

10. The method according to claim 1, wherein during deforming, different gripping elements are activated by the control depending on whether the layer to be stacked is one of the metal layers or one of the unhardened fiber layers.

11. The method according to claim 1, wherein the unhardened fiber layers have fibers oriented homogeneously.

12. The method according to claim 1, wherein the unhardened fiber layers and the metal layers are deformed in at least two Cartesian dimensions.

13. The method according to claim 1, wherein the deforming is performed such that the form of the layer to be stacked is identical to the form of the deposition surface.

14. The method according to claim 1, wherein the deforming is performed such that the form of the layer to be stacked at least slightly deviates from the form of the deposition surface.

* * * * *